United States Patent
Rodriguez-Natal et al.

(10) Patent No.: US 12,010,001 B2
(45) Date of Patent: Jun. 11, 2024

(54) EXTENDING DISTRIBUTED APPLICATION TRACING FOR NETWORK OPTIMIZATIONS

(71) Applicant: Cisco Technology, Inc., San Jose, CA (US)

(72) Inventors: Alberto Rodriguez-Natal, Leon (ES); Edward Albert Warnicke, Austin, TX (US); Saswat Praharaj, Pleasanton, CA (US); Fabio R. Maino, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/234,252

(22) Filed: Aug. 15, 2023

(65) Prior Publication Data

US 2024/0097998 A1    Mar. 21, 2024

Related U.S. Application Data

(60) Provisional application No. 63/407,070, filed on Sep. 15, 2022.

(51) Int. Cl.
*H04L 43/026* (2022.01)
*H04L 43/10* (2022.01)

(52) U.S. Cl.
CPC ............ *H04L 43/026* (2013.01); *H04L 43/10* (2013.01)

(58) Field of Classification Search
None
See application file for complete search history.

(56) References Cited

U.S. PATENT DOCUMENTS

| | | |
|---|---|---|
| 2012/0244806 A1* | 9/2012 | Sekiya .................. H04L 1/1835 455/41.2 |
| 2016/0234094 A1 | 8/2016 | Balabine et al. |
| 2017/0302553 A1 | 10/2017 | Zafer et al. |
| 2020/0162589 A1 | 5/2020 | Vijayadharan |
| 2021/0314385 A1 | 10/2021 | Pande et al. |
| 2022/0014459 A1 | 1/2022 | Ganguli et al. |

(Continued)

OTHER PUBLICATIONS

Nadig, Nikhil Dattatreya, "Testing Resilience of Envoy Service Proxy with Microservices," Kth Royal Institute of Technology, Stockholm, Sweden 2019, 58 pages.

(Continued)

*Primary Examiner* — Angela Nguyen
(74) *Attorney, Agent, or Firm* — Lee & Hayes, P.C.

(57) ABSTRACT

Techniques for extending network elements to inspect, extract, and complement tracing information added to L7 flows by application distributed tracing systems. The techniques may include receiving a Layer-7 (L7) message of an L7 flow associated with a distributed application and determining that the L7 message includes tracing information. In some examples, the tracing information may be mapped to a marking that is to be included in a Layer 3 (L3) or Layer-4 (L4) packet carrying the L7 message, and the L3 or L4 packet including the marking may be sent to an L3 or L4 network element. In some examples, the L3 or L4 network element may be configured to utilize the marking to determine a network decision for the L3 or L4 packet.

20 Claims, 8 Drawing Sheets

(56) References Cited

U.S. PATENT DOCUMENTS

2023/0064845 A1* 3/2023 Srinivasan .............. H04L 43/10
2023/0379800 A1* 11/2023 Zeng .................... H04L 67/141

OTHER PUBLICATIONS

PCT Search Report and Written Opinion dated Nov. 23, 203 for PCT Application No. PCT/US2023/030688, 16 pages.
Zhang, et al, "The Benefit of Hindsight: Tracing Edge-Cases in Distributed Systems", Feb. 11, 2022, pp. 1-16.

* cited by examiner

EXTENDING DISTRIBUTED APPLICATION TRACING FOR NETWORK OPTIMIZATIONS

CROSS-REFERENCE TO RELATED APPLICATION

This patent application claims priority to U.S. Provisional Patent Application No. 63/407,070, filed Sep. 15, 2022, which is fully incorporated herein by reference.

TECHNICAL FIELD

The present disclosure relates generally to, among other things, techniques for extending the capabilities of network elements to inspect, extract, and complement tracing information added to L7 flows by application distributed tracing systems for improved network visibility and optimization.

BACKGROUND

Distributed tracing systems are gaining popularity due to the rise of microservices and composable applications. These distributed tracing systems offer a standardized way to collect tracing information, as they leverage HTTP headers to propagate trace context across different components of the distributed application. However, the network infrastructure that supports these distributed applications is largely agnostic to distributed application tracing. In fact, the distributed tracing information is ignored by the network infrastructure, and opportunities are being missed for the network infrastructure to optimize network operations based on the distributed tracing information.

On the other hand, distributed tracing systems have an interest in network-related information, which is why they often track information such as the IP addresses and ports from where requests originate or are addressed to. Similarly, distributed tracing systems collect network metrics from an application perspective (e.g., observed latency, etc.). However, distributed tracing systems are missing out on getting actual, first-hand network information.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
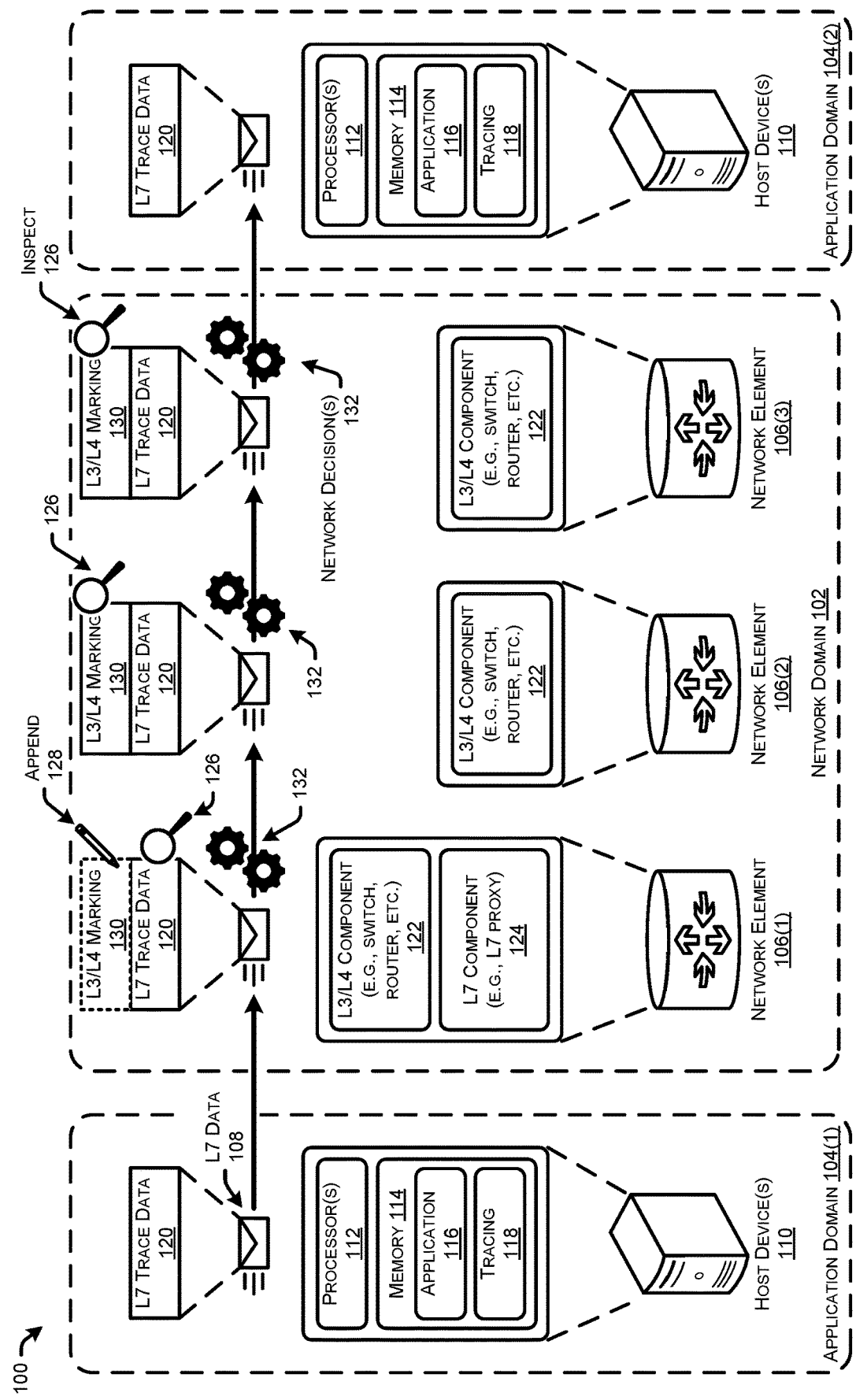
FIG. 1 illustrates an example architecture that may implement various aspects of the technologies described herein.

This disclosure describes various technologies for, among other things, extending the capabilities of network elements to be able to inspect, extract, and complement tracing information added to L7 flows by application distributed tracing systems for improved network visibility and optimization. By way of example and not limitation, a method according to the technologies disclosed herein may include receiving a Layer-7 (L7) message of an L7 flow associated with a distributed application and determining that the L7 message includes tracing information. The method may also include mapping the tracing information to a marking that is to be included in at least one of a Layer 3 (L3) or Layer-4 (L4) packet carrying the L7 message. The method may also include sending the L3 or L4 packet including the marking to an L3 or L4 network element. In some examples, the L3 or L4 network element may be configured to utilize the marking to determine a network decision for the L3 or L4 packet.

Additionally, the techniques described herein may be performed as the method and/or by a system having non-transitory computer-readable media storing computer-executable instructions that, when executed by one or more processors, cause the system and/or the one or more processors to perform the techniques described above and herein.

Example Embodiments

As noted above, distributed tracing systems are gaining popularity due to the rise of microservices and composable applications. However, the network infrastructure that supports these distributed applications is largely agnostic to distributed application tracing, and opportunities are being missed for the network infrastructure to optimize network operations based on the distributed tracing information. Additionally, distributed tracing systems also have their own interest in network-related information. However, state of the art distributed tracing systems are missing out on getting actual, first-hand network information. That is, both parties—the network infrastructure and the distributed tracing system—could be enhanced by the other, but these opportunities are being missed.

For example, many distributed tracing systems allow for collecting, processing, and exporting telemetry data from distributed applications and systems. In many ways, distributed tracing systems simplify observability in modern, complex, and distributed architectures and provide a unified approach to instrumenting applications, thereby making it easier to gather telemetry data across different languages, frameworks, and platforms. With distributed tracing systems, different types of telemetry data can be collected, such as traces, metrics, and logs. Traces can capture the flow of requests as they propagate through distributed systems, providing insights into latency, dependencies, and performance bottlenecks. Metrics provide quantitative data about the behavior and performance of applications and infrastructure, and distributed tracing systems allow for the collection of metrics related to resource usage, custom business metrics, or any other relevant data. Distributed tracing systems also support capturing logs, which are textual records of events or messages generated by the applications that provide valuable information for debugging and/or auditing purposes.

By leveraging distributed tracing systems, developers and operators can gain observability into their systems, troubleshoot performance issues, and monitor the health and behavior of their applications. However, as noted above, distributed tracing systems are missing out on obtaining actual, first-hand network information (e.g., Layer-3/Layer-4 network information). Likewise, the network infrastructure that supports distributed applications is largely agnostic to distributed application tracing, and opportunities are being missed for the network infrastructure to optimize network operations based on the distributed tracing information.

For example, Layer-3 and/or Layer-4 (L3/L4) network elements, such as routers, switches, and the like, operate at the network layer (l3) of the OSI model. An L3/L4 network element's primary function is to route network traffic based on IP addresses and make forwarding decisions based on the destination network. As such, L3/L4 network elements are not typically designed—and in some cases, not capable—to inspect or process the content of data packets beyond the network (L3) and/or transport (L4) layers. Layer-7 (L7) information, on the other hand, resides at the application layer of the OSI model. L7 information generally includes details related to specific application protocols, such as HTTP, FTP, SMTP, and others. L7 information encompasses data such as headers, payloads, and application-specific metadata (e.g., distributed application tracing information) that is relevant to the particular application being used.

Because L3 network elements typically operate at a lower level of the OSI model and do not have the capability to analyze or interpret L7 information, their primary focus is on forwarding packets based on IP routing tables and making decisions based on network addresses. Additionally, L7 information requires a higher level of processing and context awareness to understand the content, structure, and semantics of the application layer protocols. This level of analysis typically falls within the domain of L7-aware devices, such as application delivery controllers (ADCs), firewalls, web proxies, and deep packet inspection (DPI) devices. Unlike L3/L4 network elements, these L7 devices are specifically designed to handle L7 protocols, understand the application-specific semantics, and perform tasks like content filtering, protocol optimization, or security inspection.

This application is directed to techniques for extending the capabilities of network elements (e.g., traditionally Layer-3 and/or Layer-4 (L3/L4) network elements) to inspect, extract, and complement tracing information added to Layer-7 (L7) flows by application distributed tracing systems (e.g., OpenTelemetry, Jaegger, Zipkin) for improved network visibility and optimization. For instance, in some examples, a packet of a L7 flow associated with a distributed application (e.g., microservices application) may be received. In some examples, the L7 flow may traverse a network domain disposed between different application domains hosting the distributed application (e.g., a first application domain hosting a first microservice and a second application domain hosting a second microservice). In some examples, a determination may be made that the packet includes tracing information included in a L7 portion of the packet (e.g., a HTTP header). The tracing information may be mapped to a marking included in at least one of a L3/L4 portion of the packet and the packet including the marking may be sent to an L3/L4 network element of the network domain. In this way, because the tracing information was mapped to the L3/L4 marking, the L3/L4 network element may be capable of inspecting the marking and/or utilizing the marking to determine a network decision for the packet.

By way of example, and not limitation, a method according to the techniques disclosed herein may include receiving a L7 message including L7 tracing information. In some examples, the L7 message may be received at a L3/L4 edge network element of a network domain, such as a router, switch, or the like. Additionally, or alternatively, the L7 message may be received at a L7 device of an application domain where the message originated from. In some examples, the L7 message may be part of a L7 flow associated with a distributed application or other L7 service. In some examples, the L7 flow may be traversing the network domain, which can be disposed between different application domains. That is, the network domain—also referred to herein as, simply, "network"—may allow communications between a first application domain (e.g., a first datacenter) and a second application domain (e.g., a second datacenter) where distributed applications and other L7 services are being hosted.

In some examples, a determination may be made—by the network element receiving the packet—that the L7 message includes the L7 tracing information. That is, the network element may determine that tracing information is included in, for instance, a L7 header of the message. In some examples, the tracing information may have been added to the L7 message by a distributed tracing system (e.g., OpenTelemetry, Jaegger, Zipkin, etc.). In some examples, the L7 tracing information may be mapped to a L3/L4 marking. For instance, if the receiving network element is a L3/L4 network element, then a L7-capable component (e.g., network element, proxy, etc.) may be co-located with the L3/L4 network element, and the L7-capable component may map the L7 tracing information to the L3/L4 marking and/or append the L3/L4 marking to an L3/L4 packet encapsulating the L7 message. In other words, the tracing information included in the L7 portion of the packet may be mapped to marking that is added to the L3/L4 packet encapsulating that L7 portion. Additionally, or alternatively, if the receiving network element is a L7-capable component in the application domain, then the network element can inspect and map the L7 tracing information to the L3/L4 marking. In this way, the packet may include the L3/L4 marking before the packet leaves the application domain. In some examples, the receiving network element may be an edge network device.

In some examples, after the L3/L4 marking is appended to the packet, the packet may be sent to an L3/L4 network element of the network domain. In some examples, the L3/L4 network element may be configured to utilize the L3/L4 marking to determine a network decision for the packet. That is, the L3/L4 network element may examine the L3/L4 marking and determine an optimized network decision for the packet, such as a next hop for the packet, an underlay network path for the packet, queue priority, a Quality of Service (QoS) to apply, a service level agreement (SLA) or service level objective (SLO) associated with the flow, an encryption to use, etc. Additionally, or alternatively, in some examples, the L3/L4 network element may append network-related metadata to the packet. In some examples, the network-related metadata may include, among other things, an identifier associated with the L3/L4 network element, a latency associated with the L3/L4 network element, an IP address of the L3/L4 network element, a MAC address of the L3/L4 network element, a port number of the L3/L4 network element, a protocol being used for data transmission, packet headers, network topology, a bandwidth of the L3/L4 network element and/or connected links, device information of the L3/L4 network element (e.g., manufacturer, model, firmware version, operating system, etc.), network traffic statistics, security information, DNS records, SSL/TLS Certificates, network events, QoS information, and/or other relevant network metadata.

In some examples, the L3/L4 marking may convey or otherwise indicate various information. For instance, the L3/L4 marking may be indicative that the L7 trace metadata exists, that a trace is taking place, actions for L3 elements to perform, and the like. Additionally, in some examples, the L3/L4 marking may contain or represent the information conveyed in the L7 tracing itself (e.g., or a summary/subset of it).

According to the techniques disclosed herein, several advantages in computer-related technology may be realized. For example, according to the techniques disclosed herein, network infrastructures are able to understand and/or participate in distributed tracing systems used by modern applications (e.g., microservices and/or containerized applications). This provides benefits to the distributed tracing systems by being able to track, analyze, and/or report network-related information. Additionally, the network infrastructure supporting these modern applications also are able to benefit from having access to the L7 tracing information, allowing network elements to make optimized networking decisions to improve the performance of the network. These and other advantages will be readily apparent to those having ordinary skill in the art.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example architecture 100 that may implement various aspects of the technologies described herein. The architecture 100 includes a network domain 102 that is disposed between a first application domain 104(1) and a second application domain 104(2) (hereinafter referred to collectively as "application domains 104"). In some examples, the network domain 102 may be a wide area network (WAN), such as a software-defined wide area network (SD-WAN).

The network domain 102 may include multiple network elements, such as the network elements 106(1), 106(2), and 106(3) (hereinafter referred to collectively as "network elements 106"). In examples, the network elements 106 may be L3/L4 network devices, such as routers, switches, firewalls, load balancers, proxy servers, and/or the like. Among other things, the network elements 106 may encapsulate L7 data 108 (e.g., application layer data, such as an L7 request, response, or message) within L4 units (e.g., segments (TCP) or datagrams (UDP)) that contain the L7 data 108 along with transport layer (L4) headers, such as source and destination port numbers. Additionally, in some examples, the network elements 106 may further encapsulate the data into packets at L3 (e.g., network layer), which include the L3 headers (e.g., IP headers) in addition to the L4 (transport layer) units. In examples, the network elements 106 may at least partially perform these encapsulation techniques to route traffic, such as the L7 data 108, through the network domain 102.

The application domains 104 may each include one or more host device(s) 110. The host device(s) 110 may include one or more processor(s) 112 and memory 114 communicatively coupled to the processor(s) 112. The memory 114 may include computer-readable storage media that provides for the non-transitory storage of data and that can be accessed by the processor(s) 112. By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The memory 114 of the host device(s) 110 may store various components, functions, containers, and workloads associated with an application 116 and/or a tracing component 118, which may be associated with a distributed tracing system. In the context of microservices and/or containerized applications, the host device(s) 110 may run the application 116 by logically grouping together, in a pod, one or more tightly coupled containers that share the same execution context and resources of the host device(s) 110. In some examples, the application 116 may be representative of a pod hosting one or more containers that are designed to work together and provide the complete functionality of an application or a specific microservice.

In some examples, the tracing component 118 may be configured to collect and forward distributed traces from instrumented applications to the desired backend or tracing system. The tracing component 118 may facilitate the collection, processing, and transmission of trace data, and operate as an intermediary between the instrumented application and the tracing backend. In some examples, the tracing component 118 may include L7 trace data 120 within the L7 data 108 that is being sent over the network domain 102. In examples, the L7 trace data 120 may include, but not be limited to, information related to a trace, such as a trace ID, a span, timing information (e.g., timestamps, latencies, etc.), contextual information (e.g., name or identifier of the service/component involved in a span, tags or labels associated with the span, and/or other metadata for understanding the context of the operation), relationships between spans, and/or the like.

In examples, the network elements 106 may include a L3/L4 component 122, such as a switch, router, proxy, or the like. The L3/L4 component 122 may perform the various operations at L3 and/or L4 to forward the L7 data 108 through the network domain 102 to the host device(s) 110 of the second application domain 104(2). Additionally, the network element 106(1) includes a L7 component 124, which may be a L7 proxy in some examples. For example, there may be cases, such as illustrated in FIG. 1, where not all network elements 106 are able to directly understand the L7 trace data 120 (e.g., lack of proxy support) or where some of the network elements 106 might not be configured to do so (e.g., for performance reasons). In such scenarios, in addition to being able to inspect 126 the L7 trace data 120, the edge network element 106(1) may also append 128 a L3/L4 marking 130 to the packets. This enables other network elements 106 down the path to inspect 126 the L3/L4 marking 130 for making network decision(s) 132 without having to rely on inspecting the L7 trace data 120. In some examples, the L3/L4 marking 130 may be at least partially performed by extending a socket API to allow the L7 component 124 signal to the network stack (e.g., the L3/L4 component 122) to do the marking.

While illustrated in FIG. 1 that the L3/L4 component 122 and the L7 component 124 are part of the network element 106(1), it is to be understood that the components are illustrated this way for ease of illustration. That is, in some examples the L3/L4 component 122, which may be a router, switch, etc., may be a different physical device from the L7 component 124, which may be a L7 proxy. In other words, the L7 component 124 may be a standalone device that is co-located with the L3/L4 component 122, which may also be its own standalone device. Additionally, in some examples, the L3/L4 component 122 and the L7 component 124 may be virtual. That is, the L3/L4 component 122 and the L7 component 124 may be virtual components running on or hosted by one or more computing devices (e.g., servers) such that they are easily scaled.

Figure 2:
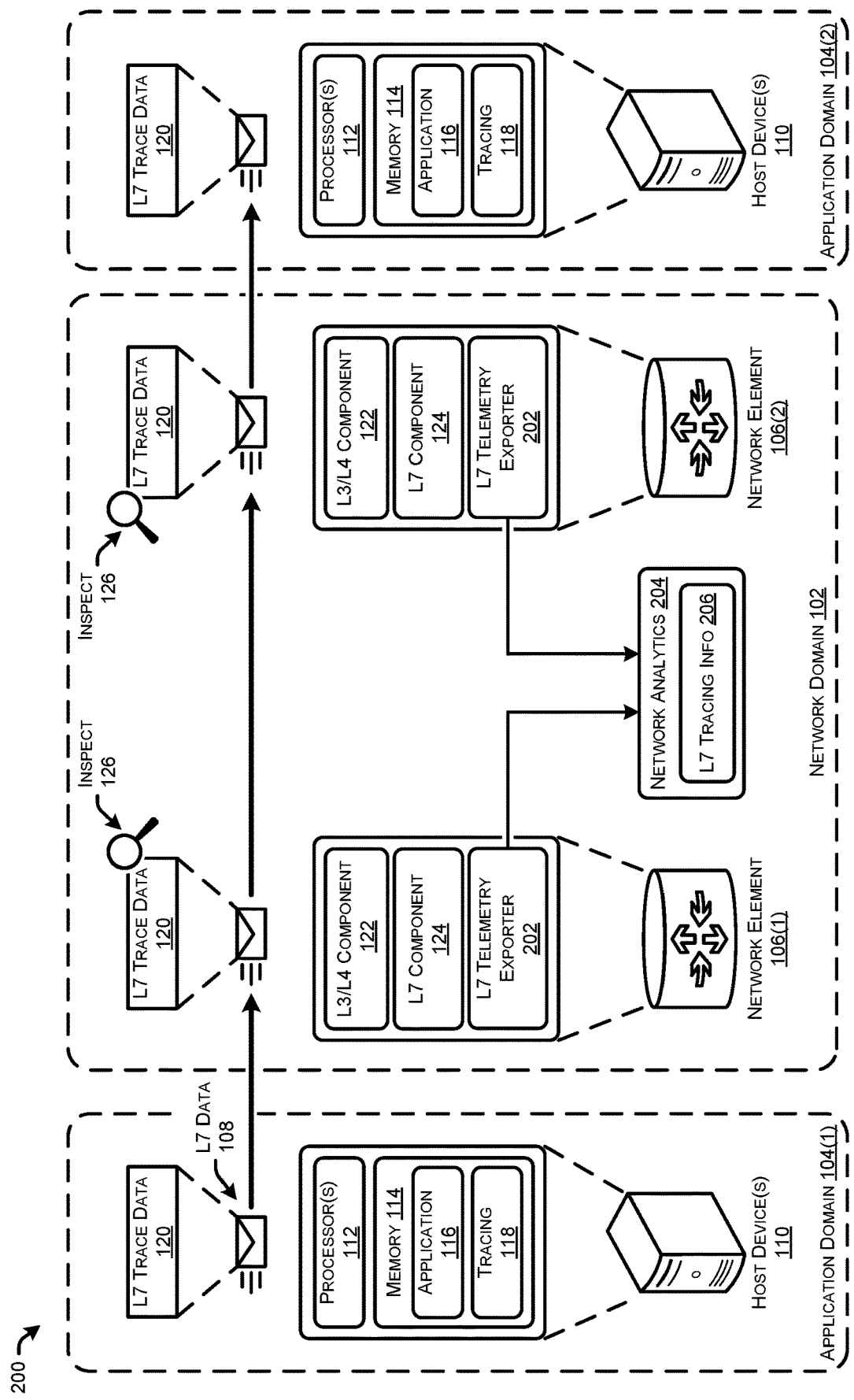
FIG. 2 illustrates another example architecture that may implement various aspects of the technologies described herein.

FIG. 2 illustrates another example architecture 200 that may implement various aspects of the technologies described herein. In many ways, the architecture 200 is similar to the architecture 100 of FIG. 1, except that the network elements 106 shown in FIG. 2 each include a respective L7 component 124 (e.g., L7 proxy) and a L7 telemetry exporter 202. In examples, the L7 components 124 may inspect 126 the L7 trace data 120. In this way, the network infrastructure can be aware of distributed tracing systems and leverage them. For this, the network elements 106 may need the capability of inspecting L7 headers (e.g., HTTP header "trace-context" from W3C), which is typically done by the use of a L7 proxy (e.g., the L7 components 124) that is collocated with, or part of, the network elements 106.

In examples, the L7 telemetry exporters 202 may export some or all of the L7 trace data 120 to a network analytics system 204. For instance, with access to the L7 trace data 120 (e.g., L7 tracing headers), the network elements 106 can incorporate them in their analytic systems. As an example, the network elements 106 may indicate which L7 trace spans traverse certain network paths. The process of sending the L7 trace data 120 to the network analytics system 204 may include incorporating application telemetry exporters in the network elements 106, for instance, by implementing an OpenTelemetry exporter. In examples, the network analytics system 204 may store the L7 tracing information 206, as well as analyze, aggregate, and present the L7 tracing information 206 to interested parties (e.g., a network controller).

Figure 3:
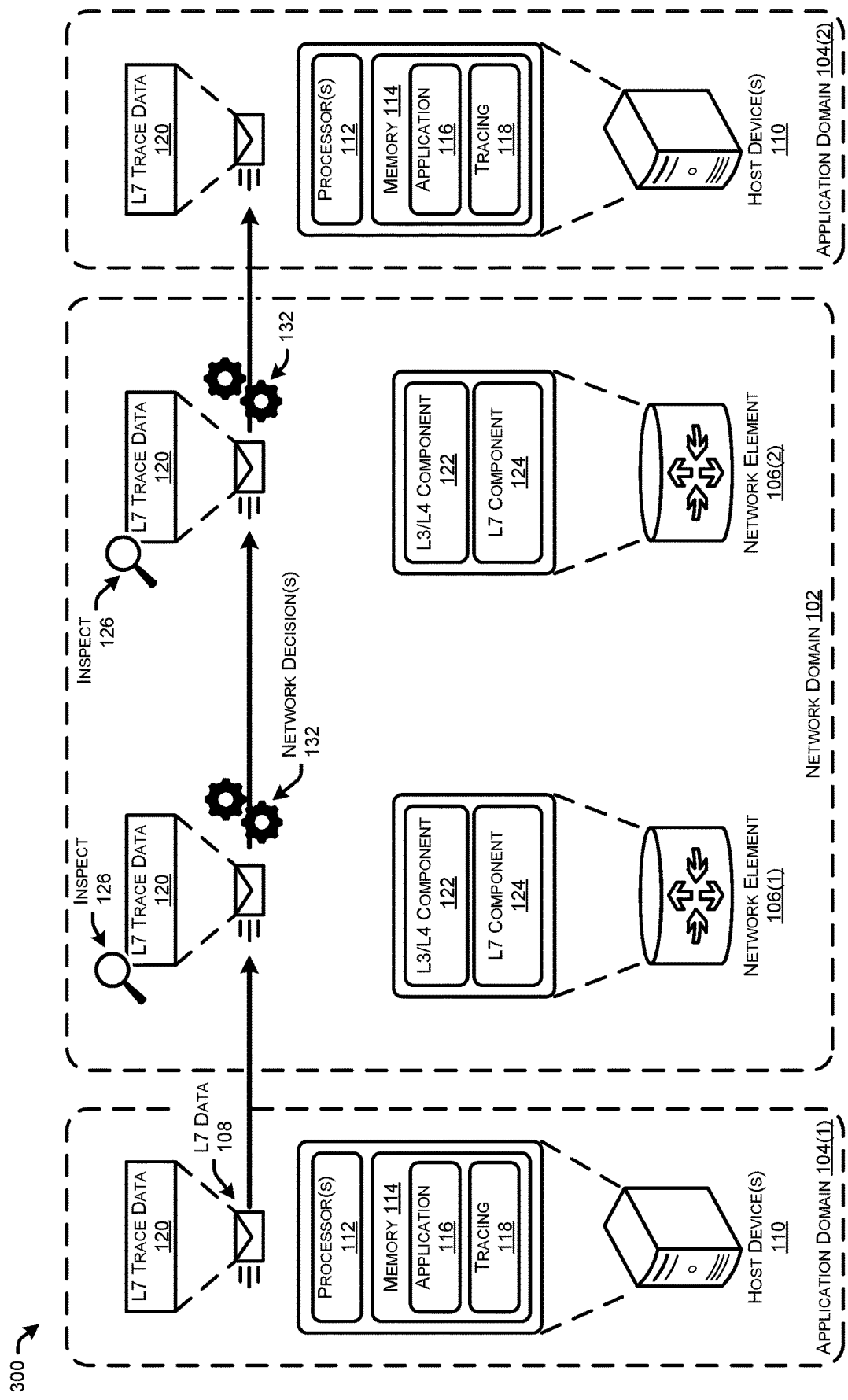
FIG. 3 illustrates yet another example architecture that may implement various aspects of the technologies described herein.

FIG. 3 illustrates yet another example architecture 300 that may implement various aspects of the technologies described herein. In many ways, the architecture 300 is similar to the architectures 100 and 200 of FIGS. 1 and 2, except that the network elements 106 shown in FIG. 3 each include a respective L7 component 124 (e.g., L7 proxy). In examples, the L7 components 124 may inspect 126 the L7 trace data 120. In this way, the network infrastructure can be aware of distributed tracing systems and leverage them. For this, the network elements 106 may need the capability of inspecting L7 headers (e.g., HTTP header "trace-context" from W3C), which is typically done by the use of a L7 proxy (e.g., the L7 components 124) that is collocated with, or part of, the network elements 106.

Figure 4:
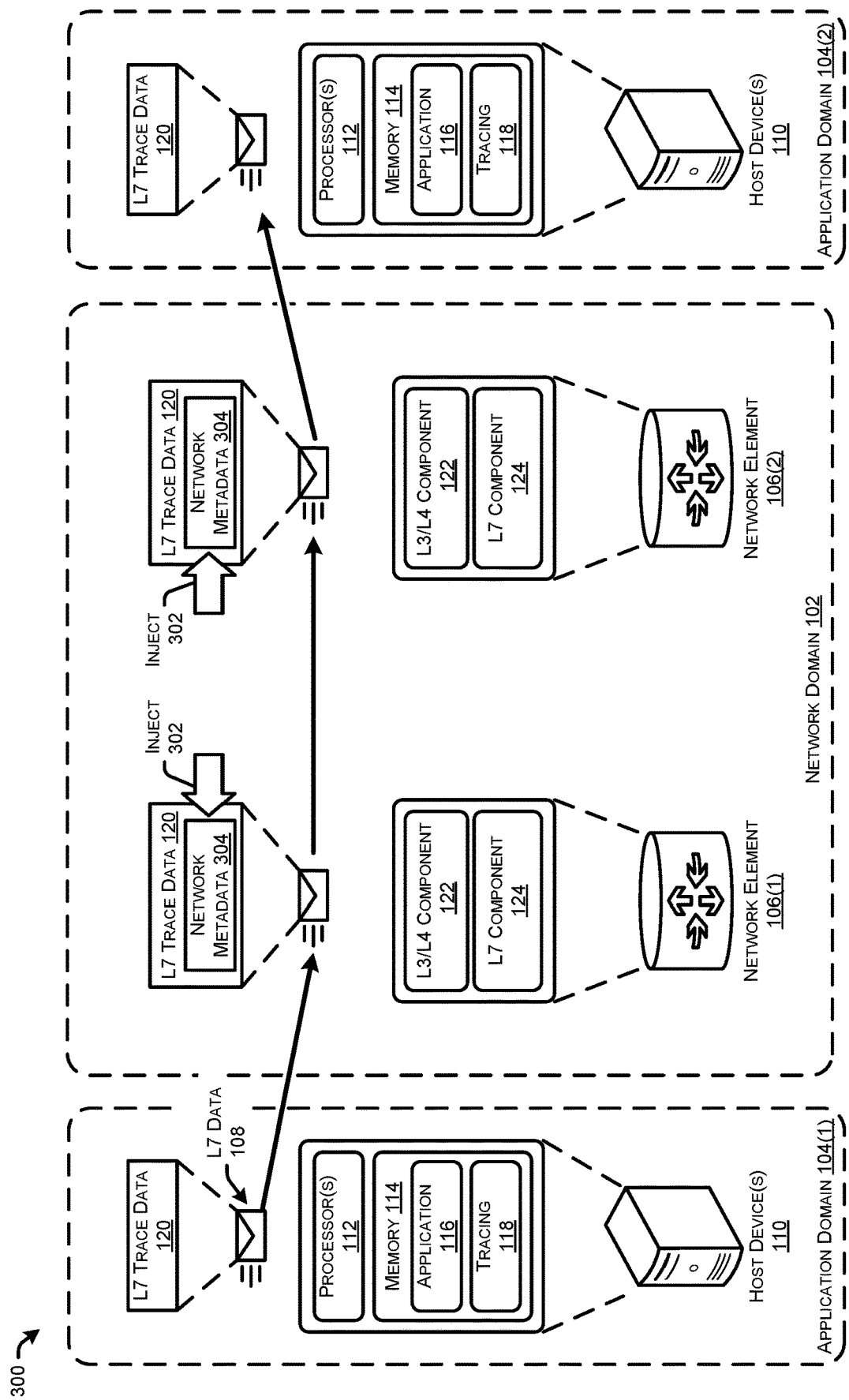
FIG. 4 illustrates an example of injecting network metadata within Layer-7 trace data.

Not only that, but also with access to the L7 trace data 120 via the L7 components 124, the network elements 106 can leverage the L7 trace data 120 to take network decision(s) 132, such as routing traffic over different paths based on, for instance, a span ID included in the L7 trace data 120. In addition to being aware of the L7 trace data 120 and the distributed tracing systems, the network elements 106 may also actively contribute to them. For instance, FIG. 4 illustrates an example of the network elements 106 being able to inject 302 network metadata 304 within the L7 trace data 120. Again, this could be achieved by the use of the L7 components 124. Such network elements 106 may be able to insert network-related and relevant metadata in the L7 tracing metadata for visibility and consumption at L7, thus enriching distributed tracing systems.

In examples, the network elements 106 may inject 302 the network metadata 304 in different ways. For instance, the network elements 106 may create their own spans within the distributed tracing process to represent network operation(s). Additionally, or alternatively, the network elements 106 may inject 302 the network metadata 304 to distributed tracing headers. Several alternatives can be used here, for instance, in the case of HTTP, the network elements 106 may introduce metadata in the "Tracestate" header (part of the "Trace Context" headers) or the "Baggage" header, all defined by the W3C.

In examples, several network metadata pieces exist that the network elements 106 could add to L7 traces and that won't be available otherwise to the application tracing systems. For instance, application tracing systems could be provided with a list of different network elements 106 the trace has traversed. In another example, the latency observed at L7 could be decomposed into different L3 sections at the network domain 102 and provided to the L7 distributed tracing system.

Figure 5:
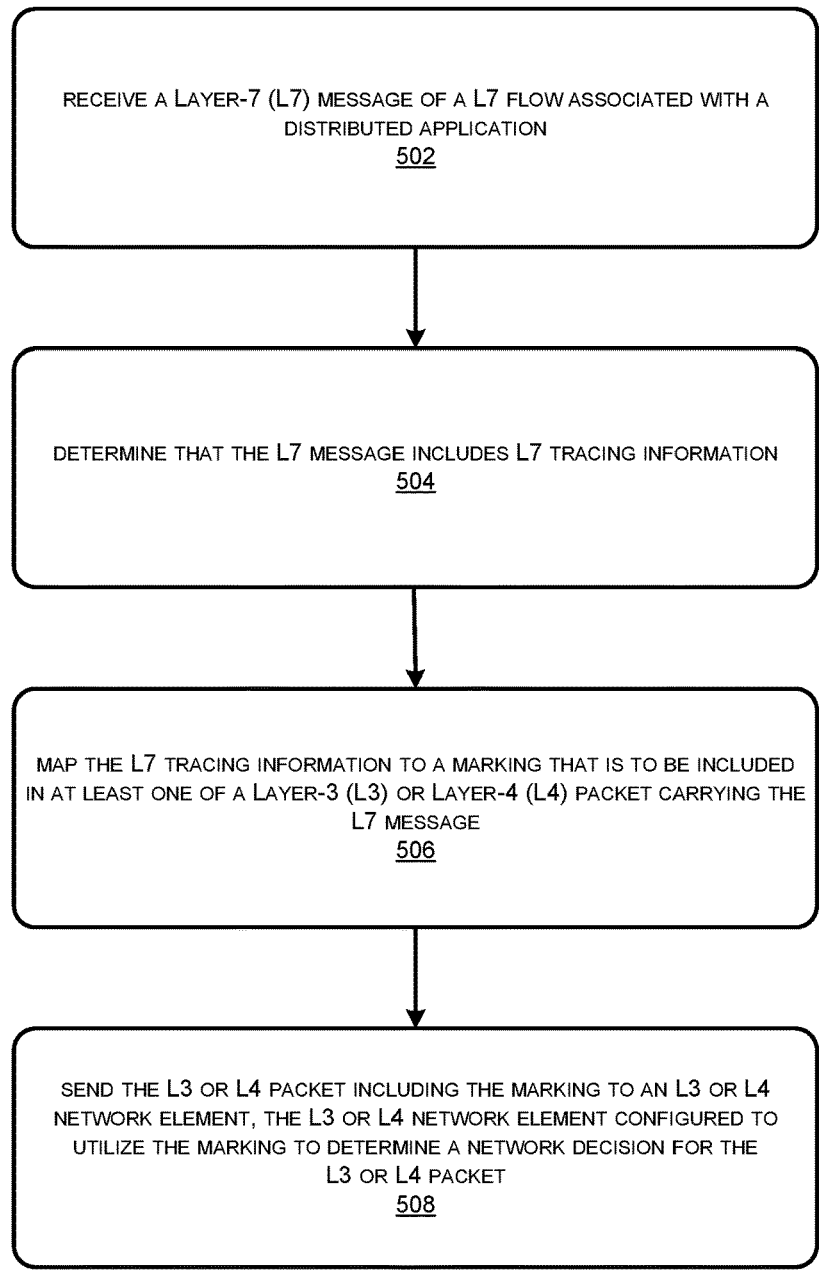
FIG. 5 is a flowchart illustrating an example method associated with the techniques described herein.

FIG. 5 is a flowchart illustrating an example method 500 associated with the techniques described herein. The logical operations described herein with respect to FIG. 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 5 and described herein. These operations can also be performed in parallel, or in a different order than those described herein. Some or all of these operations can also be at least partially performed by components other than those specifically identified. Although the techniques described in this disclosure is with reference to specific components, in other examples, the techniques may be implemented by less components, more components, different components, or any configuration of components.

The method 500 begins at operation 502, which includes receiving a Layer-7 (L7) message of a L7 flow associated with a distributed application. For instance, the network element 106(1) may receive the L7 (application layer) message of the L7 flow associated with the distributed application 116.

At operation 504, the method 500 includes determining that the L7 message includes L7 tracing information. For instance, the L7 component 124 (e.g., L7 proxy) associated with the network element 106(1) may determine that the L7 message includes the L7 trace data 120. In some examples, the L7 component 124 associated with the network element 106(1) may examine the message and/or packet to determine that the L7 tracing information exists, what is included in the L7 tracing information, and the like. For instance, depending on the location of the network element with respect to the application domain and the network domain, the network element may receive an L7 message (or request or response) or an L3/L4 packet encapsulating the L7 message. In any event, the network element may have the capability to inspect the L7 tracing information (e.g., the network element may be co-located with or include a L7-capable component) and map that L7 information to a marking.

At operation 506, the method 500 includes mapping the L7 tracing information to a marking that is to be included in at least one of a Layer-3 (L3) or Layer-4 (L4) packet carrying the L7 message. For instance, the network element 106(1)—or more specifically, the L3/L4 component 122 and/or the L7 component 124—may map the L7 trace data 120 to the L3/L4 marking 130 that is to be included in the L3 or L4 (L3/L4) packet carrying the L7 message (e.g., the L7 data 108). In some examples, the marking that the L7 information is mapped to may be indicative of various information. For instance, the marking may indicate that an L7 trace is being performed on the L7 message, such as a trace ID, a span, timing information (e.g., timestamps, latencies, etc.), contextual information (e.g., name or identifier of the service/component involved in a span, tags or labels associated with the span, and/or other metadata for understanding the context of the operation), relationships between spans, and/or the like. In some examples, the marking may indicate instructions and/or relevant data for routing the L3/L4 traffic through the network domain.

At operation 508, the method 500 includes sending the L3 or L4 packet including the marking to an L3 or L4 network element, the L3 or L4 network element configured to utilize the marking to determine a network decision for the L3 or L4 packet. For instance, the network element 106(1) may send the L3/L4 packet including the L3/L4 marking 130 to the network element 106(2), and the network element 106(2) may be configured to inspect 126 the L3/L4 marking 130 to determine network decision(s) 132 for the L3/L4 packet. In some examples, the L3/L4 network element may determine a path for routing the L3/L4 packet(s) encapsulating the L7 data based on the marking, such as based on a span ID or trace ID indicated in the marking.

Figure 6:
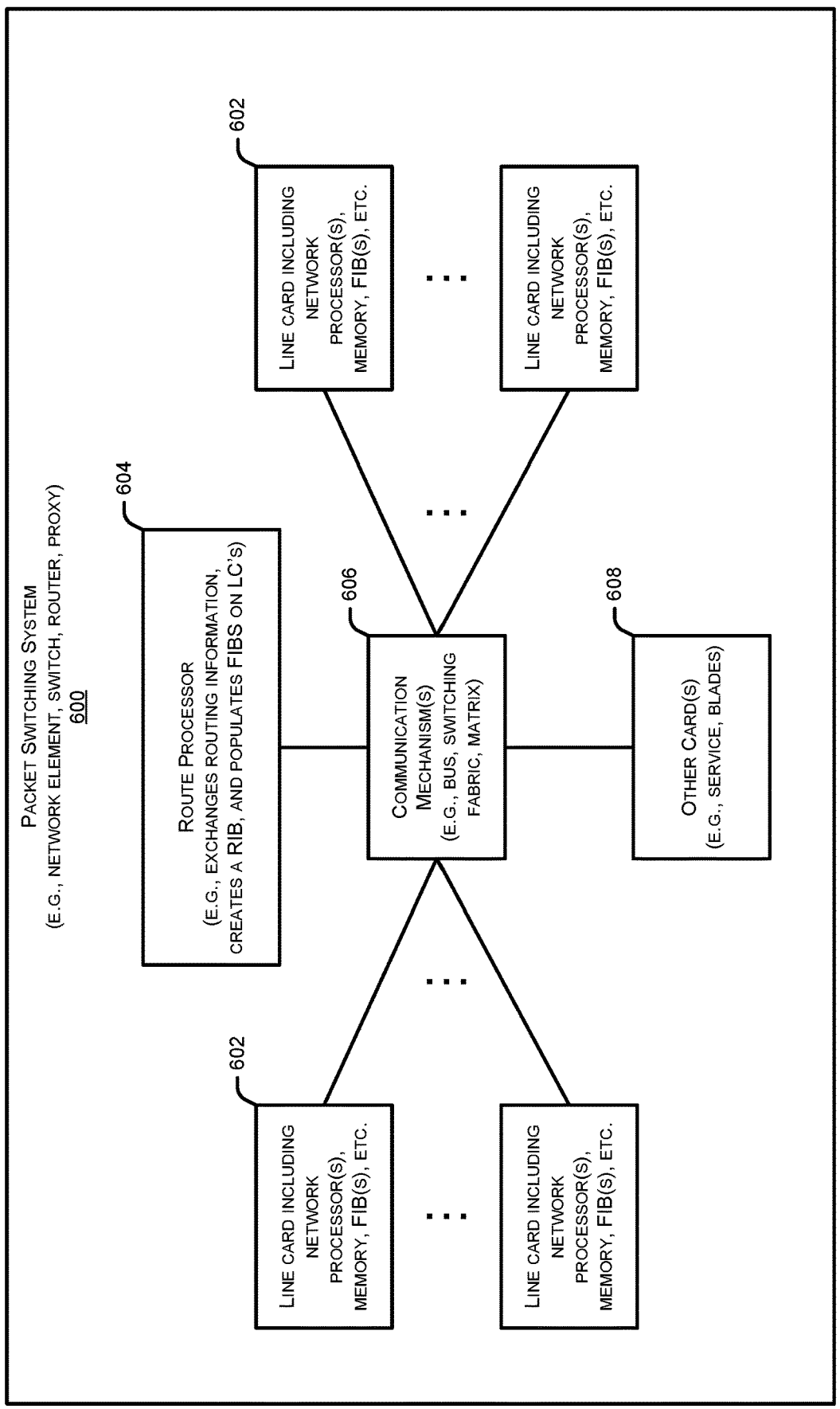
FIG. 6 is a block diagram illustrating an example packet switching system that can be utilized to implement various aspects of the technologies disclosed herein.

FIG. 6 is a block diagram illustrating an example packet switching system 600 that can be utilized to implement various aspects of the technologies disclosed herein. In some examples, packet switching system 600 may be employed in various networks and architectures, such as, for example, the architectures 100, 200, and 300 as described with respect to FIGS. 1-3. In examples, the network elements 106 may be packet a switching system 600 and/or device.

In some examples, a packet switching system 600 may comprise multiple line card(s) 602, each with one or more network interfaces for sending and receiving packets over communications links (e.g., possibly part of a link aggregation group). The packet switching system 600 may also have a route processor 604, which may exchange routing information, create routing information base(s) (RIBs), and/or populate forward information base(s) (FIBs) on LCs. The packet switching system 600 may also have a control plane with one or more processing elements for managing the control plane and/or control plane processing of packets associated with forwarding of packets in a network. The packet switching system 600 may also include other cards 608 (e.g., service cards, blades) which include processing elements that are used to process (e.g., forward/send, drop, manipulate, change, modify, receive, create, duplicate, apply a service) packets associated with forwarding of packets in a network. The packet switching system 600 may include hardware-based communication mechanism(s) 606 (e.g., bus, switching fabric, and/or matrix, etc.) for allowing its different entities to communicate. The line card(s) 602 may typically perform the actions of being both an ingress and/or an egress line card 602 in regard to multiple other particular packets and/or packet streams being received by, or sent from, packet switching system 600.

Figure 7:
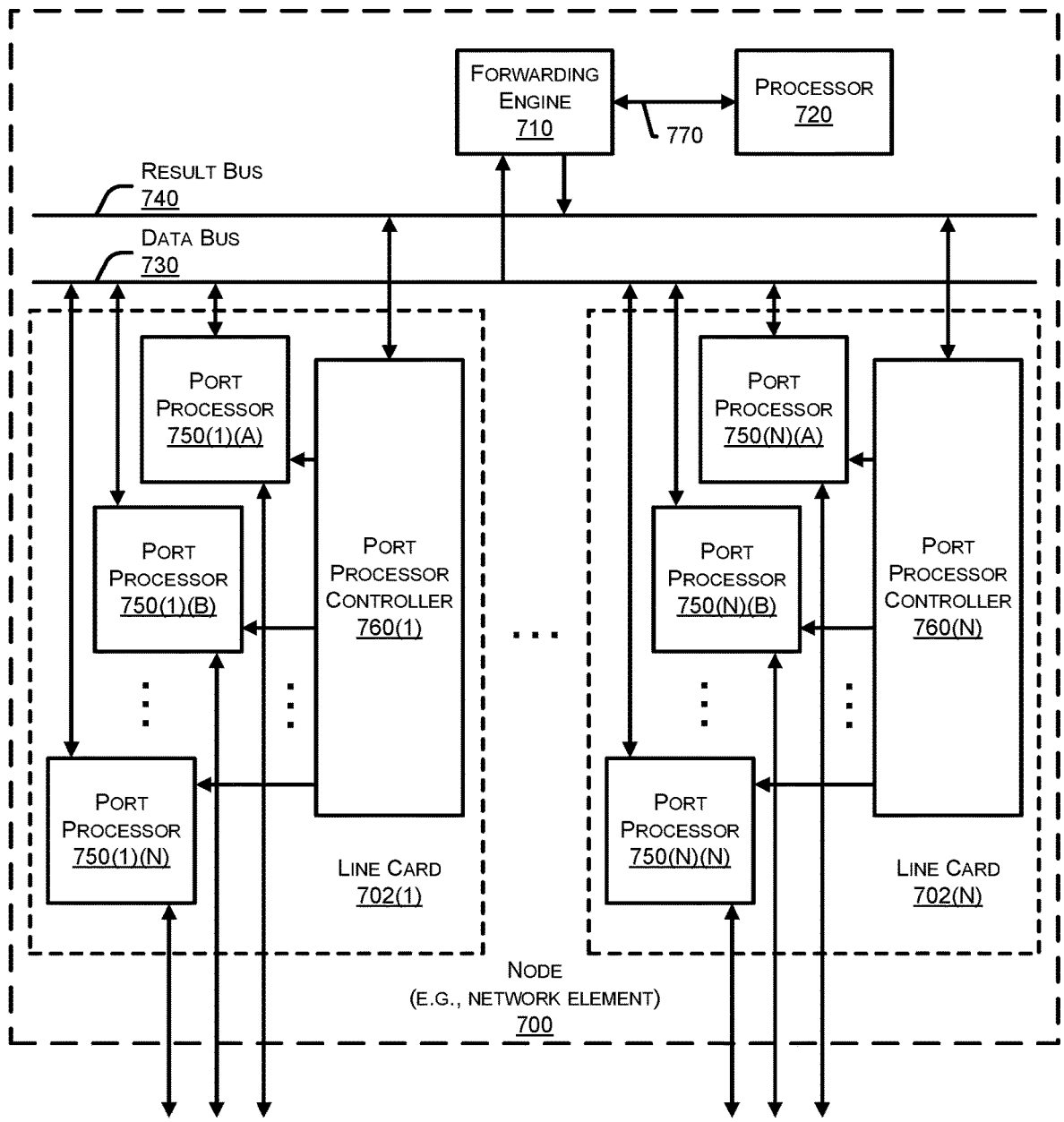
FIG. 7 is a block diagram illustrating certain components of an example node that can be utilized to implement various aspects of the technologies disclosed herein.

FIG. 7 is a block diagram illustrating certain components of an example node 700 that can be utilized to implement various aspects of the technologies disclosed herein. In some examples, node(s) 700 may be employed in various architectures and networks, such as, for example, the architectures 100, 200, and 300 as described with respect to FIGS. 1-3. In examples, the network element(s) 106 may be node(s) 700.

In some examples, node 700 may include any number of line cards 702 (e.g., line cards 702(1)-(N), where N may be any integer greater than 1) that are communicatively coupled to a forwarding engine 710 (also referred to as a packet forwarder) and/or a processor 720 via a data bus 730 and/or a result bus 740. Line cards 702(1)-(N) may include any number of port processors 750(1)(A)-(N)(N) which are controlled by port processor controllers 760(1)-(N), where N may be any integer greater than 1. Additionally, or alternatively, forwarding engine 710 and/or processor 720 are not only coupled to one another via the data bus 730 and the result bus 740, but may also communicatively coupled to one another by a communications link 770.

The processors (e.g., the port processor(s) 750 and/or the port processor controller(s) 760) of each of the line cards 702 may be mounted on a single printed circuit board. When a packet or packet and header are received, the packet or packet and header may be identified and analyzed by node 700 (also referred to herein as a router) in the following manner. Upon receipt, a packet (or some or all of its control information) or packet and header may be sent from one of port processor(s) 750(1)(A)-(N)(N) at which the packet or packet and header was received and to one or more of those devices coupled to the data bus 730 (e.g., others of the port processor(s) 750(1)(A)-(N)(N), the forwarding engine 710 and/or the processor 720). Handling of the packet or packet and header may be determined, for example, by the forwarding engine 710. For example, the forwarding engine 710 may determine that the packet or packet and header should be forwarded to one or more of port processors 750(1)(A)-(N)(N). This may be accomplished by indicating to corresponding one(s) of port processor controllers 760(1)-(N) that the copy of the packet or packet and header held in the given one(s) of port processor(s) 750(1)(A)-(N)(N) should be forwarded to the appropriate one of port processor (s) 750(1)(A)-(N)(N). Additionally, or alternatively, once a packet or packet and header has been identified for processing, the forwarding engine 710, the processor 720, and/or the like may be used to process the packet or packet and header in some manner and/or may add packet security information in order to secure the packet. On a node 700 sourcing such a packet or packet and header, this processing may include, for example, encryption of some or all of the packet's and/or header's information, the addition of a digital signature, and/or some other information and/or processing capable of securing the packet or packet and header. On a node 700 receiving such a processed packet or packet and header, the corresponding process may be performed to recover or validate the packet's and/or header's information that has been secured.

Figure 8:
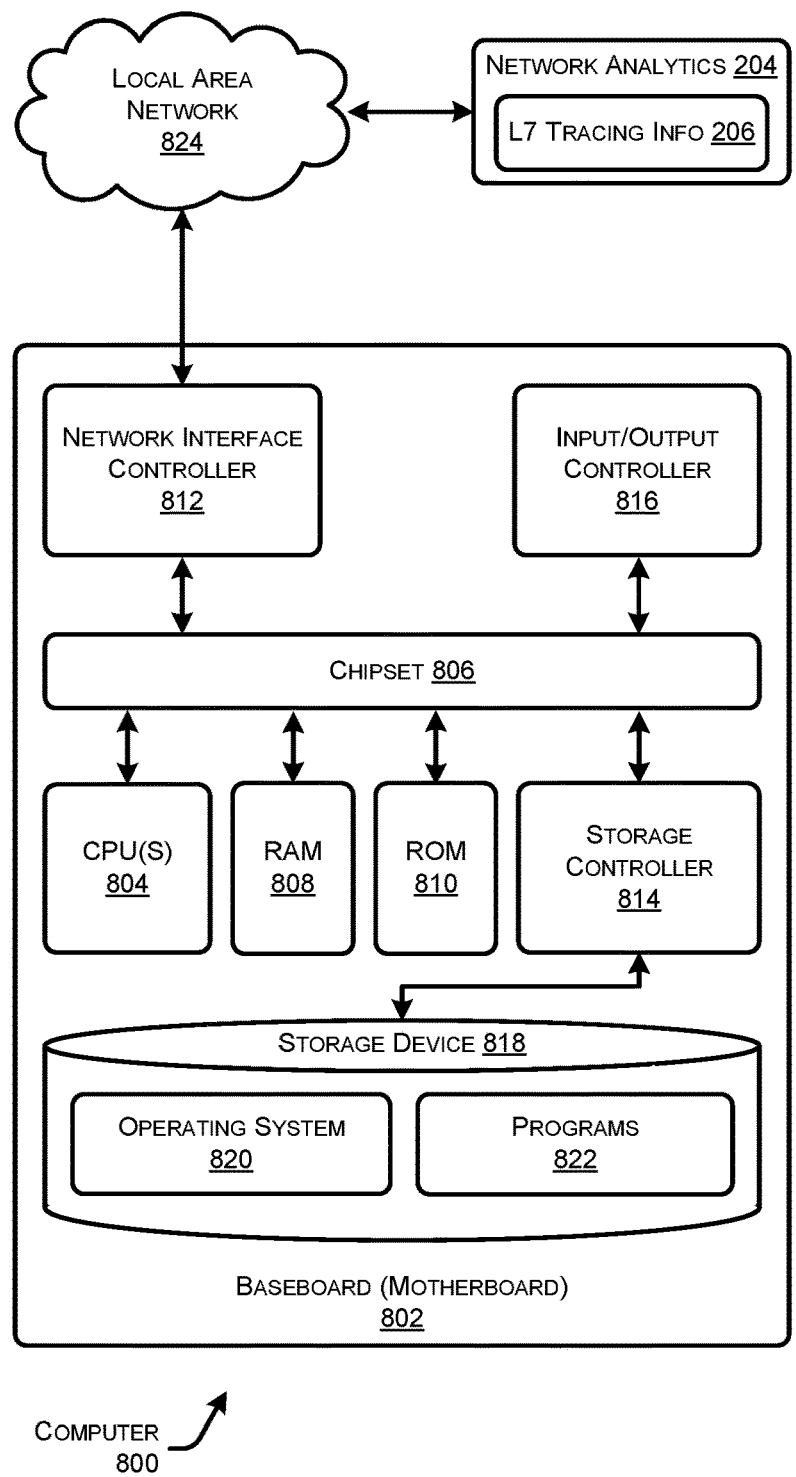
FIG. 8 is a computer architecture diagram showing an illustrative computer hardware architecture for implementing a computing device that can be utilized to implement aspects of the various technologies presented herein.

FIG. 8 is a computer architecture diagram showing an illustrative computer hardware architecture for implementing a computing device that can be utilized to implement aspects of the various technologies presented herein. The computer architecture shown in FIG. 8 illustrates a conventional server computer, network device, controller, workstation, desktop computer, laptop, tablet, network appliance, e-reader, smartphone, load balancer, or other computing device, and can be utilized to execute any of the software components presented herein.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network. The chipset 806 can include functionality for providing network connectivity through a NIC 812, such as a gigabit Ethernet adapter. The NIC 812 is capable of connecting the computer 800 to other computing devices and/or systems over the network 824, such as the network analytics system 204, and/or any other network devices described herein. It should be appreciated that multiple NICs 812 can be present in the computer 800, connecting the computer to other types of networks and remote computer systems. In some examples, the NIC 812 may be configured to perform at least some of the techniques described herein.

The computer 800 can be connected to a storage device 818 that provides non-volatile storage for the computer. The storage device 818 can store an operating system 820, programs 822, and data, which have been described in greater detail herein. The storage device 818 can be connected to the computer 800 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations performed by the architectures 100, 200, 300, and/or any components included therein, may be supported by one or more devices similar to computer 800. Stated otherwise, some or all of the operations performed by the architectures 100, 200, 300, and/or any components included therein, may be performed by one or more computing devices operating in a scalable arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the computer 800.

In one embodiment, the storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes and functionality described above with regard to FIGS. 1-7, and herein. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

The computer 800 may include one or more hardware processors (processors) configured to execute one or more stored instructions. The processor(s) may comprise one or more cores. Further, the computer 800 may include one or more network interfaces configured to provide communications between the computer 800 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 822 may comprise any type of programs or processes to perform the techniques described in this disclosure, such as for extending the capabilities of network elements to inspect, extract, and complement tracing information added to L7 flows by application distributed tracing systems for improved network visibility and optimization.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
receiving a Layer-7 (L7) message of an L7 flow associated with a distributed application;
determining that the L7 message includes tracing information;
mapping the tracing information to a marking that is to be included in a Layer-3 (L3) or Layer-4 (L4) packet carrying the L7 message; and
sending the L3 or L4 packet including the marking to an L3 or L4 network element, the L3 or L4 network element configured to utilize the marking to determine a network decision for the L3 or L4 packet.

2. The method of claim 1, wherein the L7 flow traverses an L3 or L4 network domain disposed between different host devices hosting the distributed application in an application domain.

3. The method of claim 2, wherein the tracing information is appended to the L7 message by a L7 tracing component associated with a distributed tracing system.

4. The method of claim 1, wherein the tracing information is L7 tracing information that is included in a L7 header of the L7 message.

5. The method of claim 1, wherein an L7 component is collocated with the L3 or L4 network element, the L7 component configured to append network-related metadata within the tracing information in the L7 message.

6. The method of claim 5, wherein the network-related metadata includes at least one of an identifier associated with the L3 or L4 network element or a latency associated with the L3 or L4 network element handling the L3 or L4 packet.

7. The method of claim 1, wherein the method is performed at least partially by a L3 or L4 edge network element that is collocated with a L7 proxy.

8. A system comprising:
one or more processors; and
one or more non-transitory computer-readable media storing instructions that, when executed, cause the one or more processors to perform operations comprising:
receiving a Layer-7 (L7) message of an L7 flow associated with a distributed application;
determining that the L7 message includes tracing information;
mapping the tracing information to a marking that is to be included in a Layer-3 (L3) or Layer-4 (L4) packet carrying the L7 message; and
sending the L3 or L4 packet including the marking to an L3 or L4 network element, the L3 or L4 network element configured to utilize the marking to determine a network decision for the L3 or L4 packet.

9. The system of claim 8, wherein the L7 flow traverses an L3 or L4 network domain disposed between different host devices hosting the distributed application in an application domain.

10. The system of claim 9, wherein the tracing information is appended to the L7 message by a L7 tracing component associated with a distributed tracing system.

11. The system of claim 8, wherein the tracing information is L7 tracing information that is included in a L7 header of the L7 message.

12. The system of claim 8, wherein an L7 component is collocated with the L3 or L4 network element, the L7 component configured to append network-related metadata within the tracing information in the L7 message.

13. The system of claim 12, wherein the network-related metadata includes at least one of an identifier associated with the L3 or L4 network element or a latency associated with the L3 or L4 network element handling the L3 or L4 packet.

14. The system of claim 8, the operations further comprising encapsulating the L7 message within the L3 or L4 packet including the marking.

15. One or more non-transitory computer-readable media storing instructions that, when executed, cause one or more processors associated with an edge networking device to perform operations comprising:
   receiving a Layer-7 (L7) message of an L7 flow associated with a distributed application;
   determining that the L7 message includes tracing information;
   mapping the tracing information to a marking that is to be included in a Layer-3 (L3) or Layer-4 (L4) packet carrying the L7 message; and
   sending the L3 or L4 packet including the marking to an L3 or L4 network element, the L3 or L4 network element configured to utilize the marking to determine a network decision for the L3 or L4 packet.

16. The one or more non-transitory computer-readable media of claim 15, wherein the L7 flow traverses an L3 or L4 network domain disposed between different host devices hosting the distributed application in a same application domain or in different application domains.

17. The one or more non-transitory computer-readable media of claim 16, wherein the tracing information is appended to the L7 message by a L7 tracing component associated with a distributed tracing system.

18. The one or more non-transitory computer-readable media of claim 15, wherein the tracing information is included in a L7 header of the L7 message.

19. The one or more non-transitory computer-readable media of claim 15, wherein an L7 component is collocated with the L3 or L4 network element, the L7 component configured to append network-related metadata within the tracing information in the L7 message.

20. The one or more non-transitory computer-readable media of claim 19, wherein the network-related metadata includes at least one of an identifier associated with the L3 or L4 network element or a latency associated with the L3 or L4 network element handling the L3 or L4 packet.

* * * * *